(12) United States Patent
Spies et al.

(10) Patent No.: US 6,217,135 B1
(45) Date of Patent: Apr. 17, 2001

(54) CRAWLER TRACK LINK MEMBER

(75) Inventors: Klaus Spies, Remscheid; Ekkehard Oertgen, Radevormwald, both of (DE)

(73) Assignee: Diehl Remscheid GmbH & Co., Remscheid (DE)

(*) Notice: Subject to any disclaimer, the term of this patent is extended or adjusted under 35 U.S.C. 154(b) by 0 days.

(21) Appl. No.: 09/280,874

(22) Filed: Mar. 29, 1999

(30) Foreign Application Priority Data

Apr. 29, 1998 (DE) .............................. 198 20 175

(51) Int. Cl.[7] .................... A01B 33/00; B60B 15/00; B62D 55/28
(52) U.S. Cl. ............................. 305/187; 305/191
(58) Field of Search ................. 305/46, 51, 185, 305/187 I, 188, 189, 191, 192, 190, 201

(56) References Cited

U.S. PATENT DOCUMENTS

| 3,266,853 | * | 8/1966 | Korner et al. | 305/188 |
| 3,322,472 | * | 5/1967 | Ley | 305/188 |
| 3,520,574 | * | 7/1970 | Wiesner | 305/188 |
| 3,870,380 | * | 3/1975 | Korner | 305/188 |

FOREIGN PATENT DOCUMENTS

| 1 605 509 | 6/1970 | (DE) . |
| 33 35 937 C2 | 4/1985 | (DE) . |
| 195 44 458 A1 | 6/1997 | (DE) . |
| 0 044 137 | 1/1982 | (EP) . |
| WO 96/29234 | 9/1996 | (WO) . |

* cited by examiner

Primary Examiner—S. Joseph Morano
Assistant Examiner—Jason R. Bellinger
(74) Attorney, Agent, or Firm—Scully, Scott, Murphy & Presser

(57) ABSTRACT

In the case of highly mobile vehicles overloading of the travelling pads (3) of crawler tracks frequently gives rise to incipient cracks in the base plate (14), which generally start from the bottom of the incision of the tongue. A long service life for the travelling pad (3) with base plate (14) is achieved by the base plate (14) being incision-free in the retaining region (10).

8 Claims, 5 Drawing Sheets

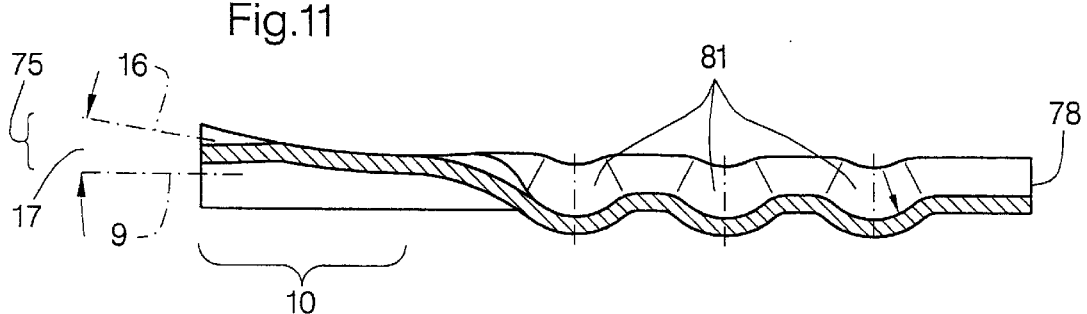
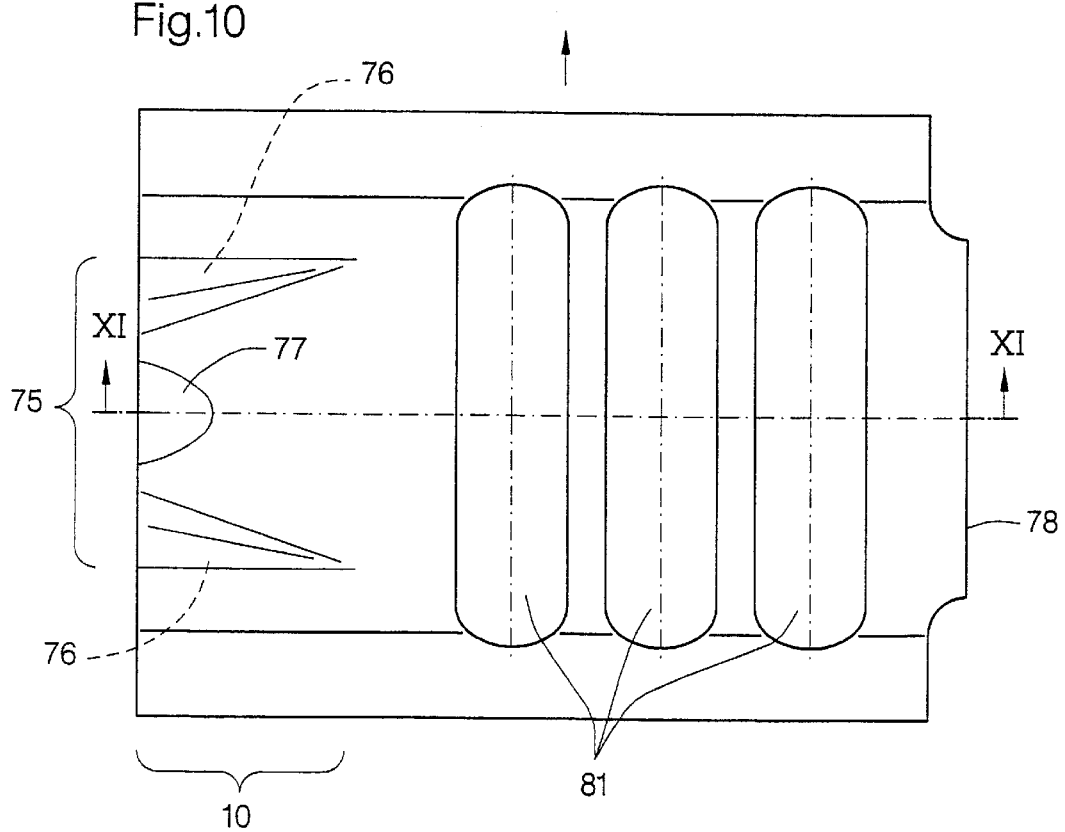

CRAWLER TRACK LINK MEMBER

BACKGROUND OF THE INVENTION

1. Field of the Invention

The invention relates to a crawler track link member which incorporates structure for the support of traveling pads, studs, snow or mud grippers or buoyancy aids.

2. Discussion of the Prior Art

German published specification (DE-AS) No 16 05 509 discloses a caterpillar or crawler track link member having a plate-shaped slide-on portion in the form of a travelling pad. A base plate which is connected to the travelling pad has a stamped-out tongue which, when the travelling pad is pushed into the crawler track link member over an abutment projection until—after the travelling pad moves into a condition of abutment—the travelling pad slides forwardly until it drops in a latching relationship on the crawler track link member behind a projection.

That fixing principle is also known in relation to travelling pads in accordance with DE 33 35 937 C2 and DE 195 44 458 A1.

During travel of the track-laying vehicle, travelling pads of that kind are subjected to stresses due to high contact pressures, thrust loadings and high dynamic shock loadings. Particularly in the case of highly mobile vehicles, overloading frequently causes the base plate to be subjected to incipient cracks or fractures which generally start from the bottom of the incision of the tongue retaining portion. If the incipient cracks or fractures are not noticed sufficiently early or if travelling pads with base plates which have been subjected to incipient cracking or fracturing due to rubber wear are not removed, then the base plate encounters a complete rupture. Travelling pads with completely fractured base plates represent a potential danger since they can fly off the track when the vehicle is travelling.

Various endeavours have been undertaken to avoid or reduce the risk of an incipient crack or fracture. For that purpose for example the notch forming factor was introduced by providing a larger radius in the incision region of the tongue, and fixing the stamping direction in the cutting operation to avoid stress peaks on the flexural tensile side. An increase in the thickness of the initial sheet metal was also tried; however, it was not possible for those measure to provide a definitive solution to the cracking problem.

SUMMARY OF THE INVENTION

The object of the present invention is intended to design the slide-on portion so as to prevent the occurrence of incipient cracks and ruptures on base plates of slide-on portions for crawler tracks.

The manner in which that object is attained provides for the securing tongue of the base plate to be no longer cut out therefrom and pushed out, but rather the base plate is provided with an impressed or stamped out portion in the region of the shaping or deformation which was earlier pushed out therefrom, and which implements the function of the deforming latching portion.

The base plate is now no longer weakened by the incisions. There is no longer any notch forming factor which had considerably increased the stress on the component. There is no need for an increase in the thickness of the base plate, which signifies that the weight of the sheet metal component is also not increased. The slide-on portion can be fitted and removed in a simple manner by existing on-board tools.

Tests which have been carried out have shown that no incipient cracks and ruptures were encountered by the base plates, over the useful life of the slide-on portion. The elimination of the incisions in the base plate also affords a reduction in manufacturing costs.

BRIEF DESCRIPTION OF THE DRAWINGS

Embodiments of the invention are illustrated in the drawing in which:

FIG. 10 shows a base plate of the travelling pad shown in FIGS. 8 and 9, and FIG. 11 is a view in cross-section taken along line XI—XI in FIG. 10.

Referring to FIG. 1, pushed into guide grooves 1 (which are not further shown) in a tubular body 2 is a travelling pad 3 with a base plate 4.

DETAILED DESCRIPTION OF PREFERRED EMBODIMENTS

Figure 1:
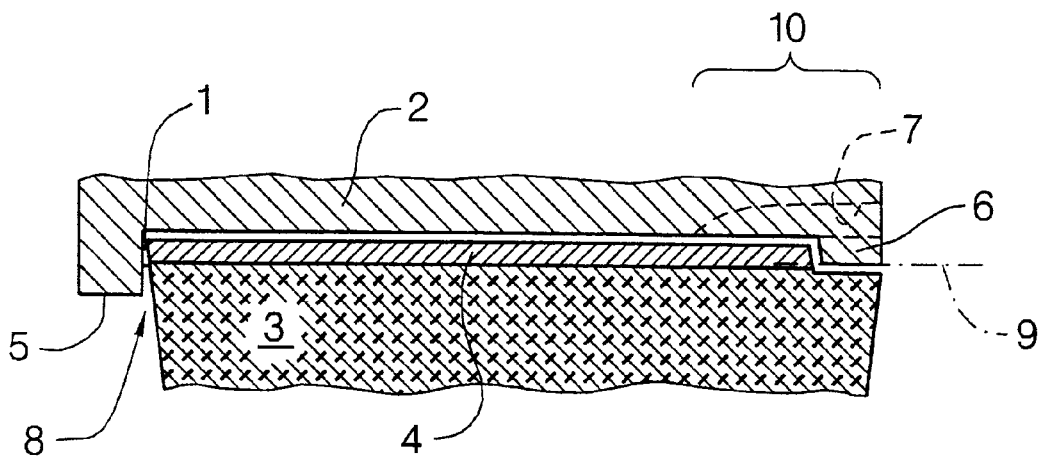
FIGS. 1 and 2 are views in cross-section of travelling pads in a crawler track link member.

The base plate 4 is disposed in a retained or latched condition between two abutments 5, 6, referring to the latching region 10. When the travelling pad 3 with the base plate 4 is pushed into the guide grooves 1 the base plate 4 slides over the abutment 6. Upon that occurrence, the base plate 4 is elastically deformed. When the travelling pad 3 is worn the base plate 4 is adapted to be lifted over the abutment 6 through an opening indicated by a phantom line at 7, by means of a tool represented by line 11 (not shown), and is to be levered out by way of a further tool (also not shown) which is to be inserted as indicated by the arrow 8. The base plate 4 is disposed in a main plane 9, and is free of any incisions, in essence it is in the form of a tongueless base plate 4.

Figure 2:
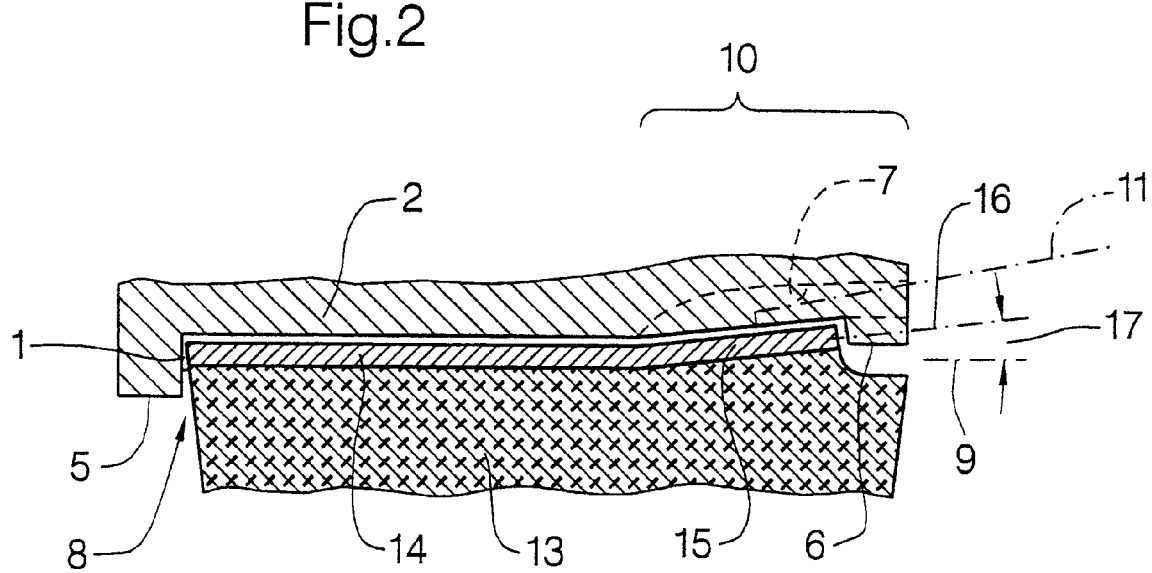

Referring to FIG. 2, in a departure from FIG. 1 a base plate 14 is provided with a deformation or shaping 15 formed by non-cutting shaping. The main plane 9 and the tongue plane 16 form an angle 17. That results in frictional contact when the travelling pad 13 is pushed in or out of the tubular body 2, only between the deformation 15 and the abutment 6. The shaping zones in the latching region 10 which result in the formation of the tongue 15 are described with reference to FIG. 7.

Figure 3:
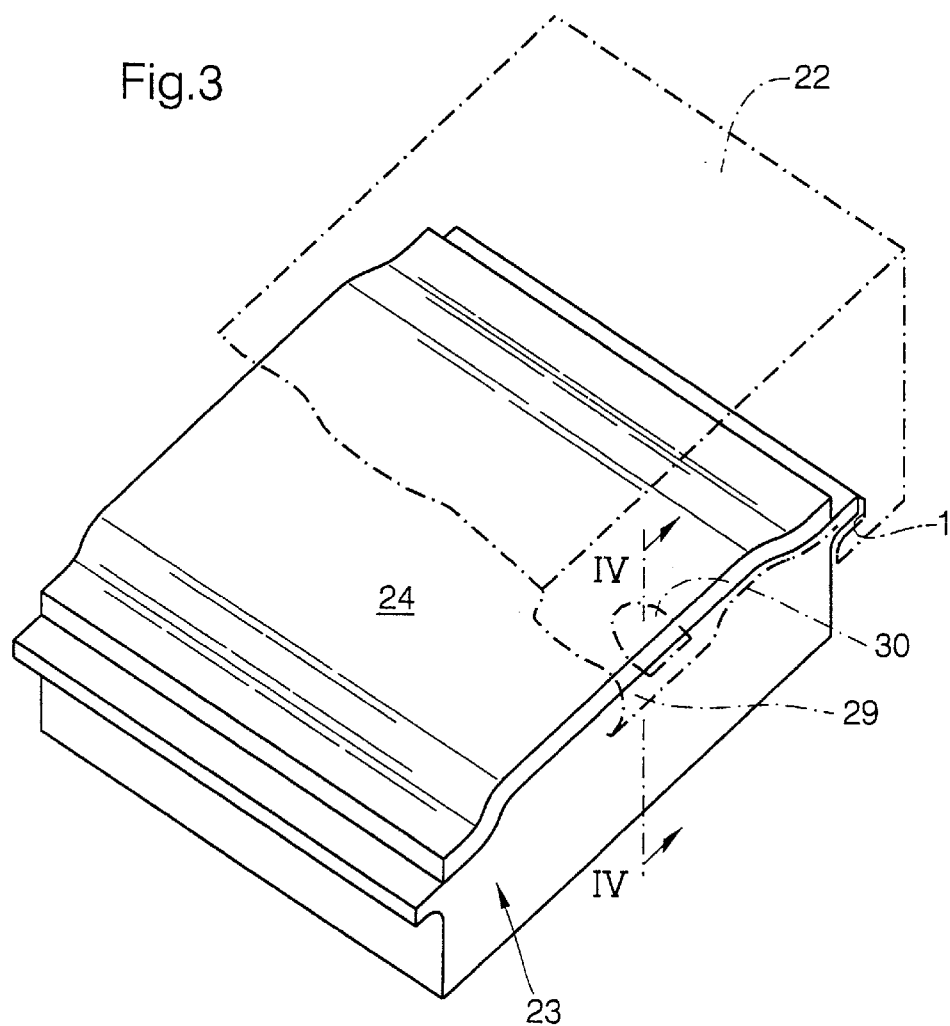
FIG. 3 is a perspective view of a travelling pad in a crawler track link member.
Figure 4:
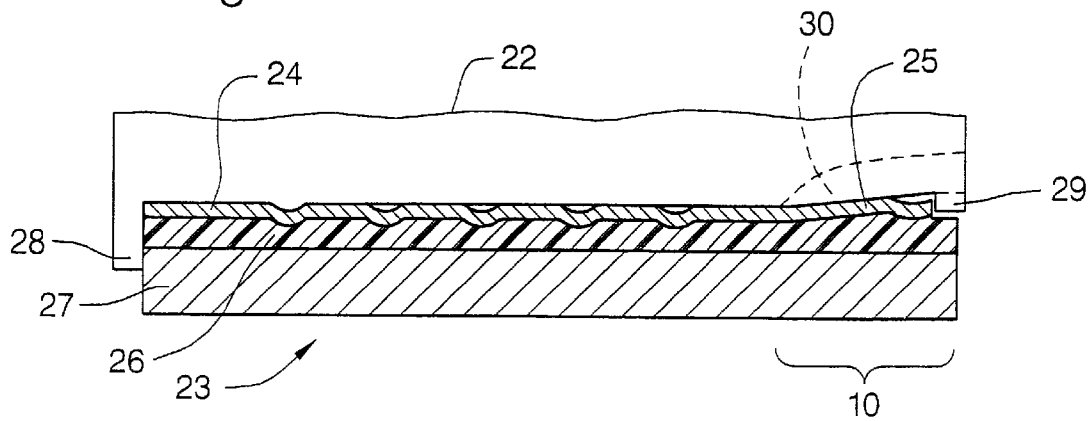
FIG. 4 is a view in section taken along line IV—IV in FIG. 3.
Figure 7:
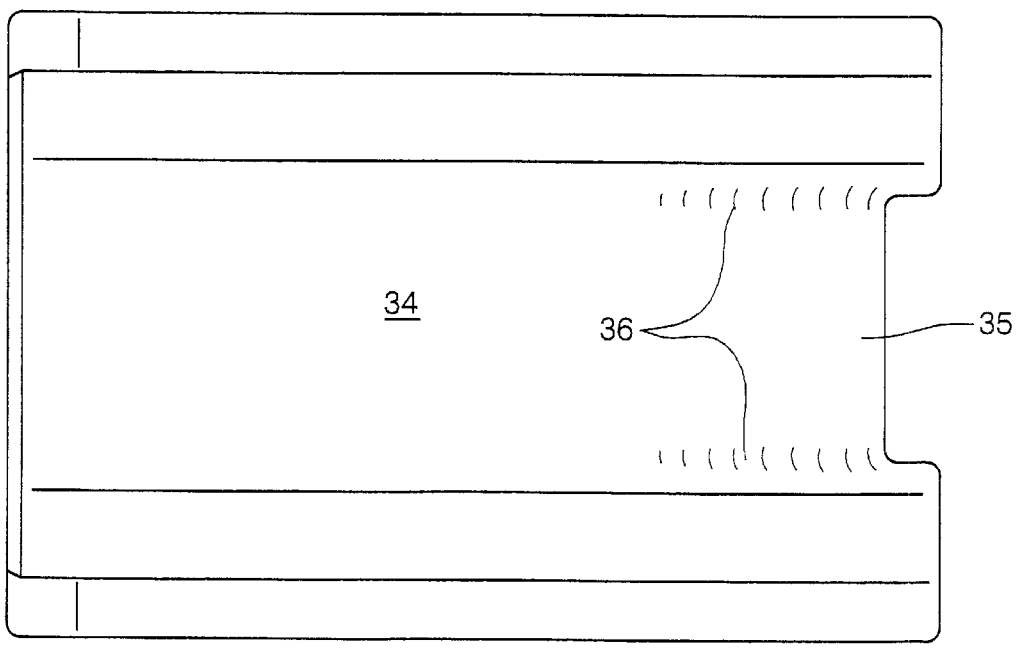
FIG. 7 shows a base plate of the travelling pad illustrated in FIG. 5.

Referring to FIGS. 3 and 4, in the case of a travelling pad 23—similarly to FIGS. 2 and 7—a base plate 24 with a tongue 25 which is formed therefrom by non-cutting shaping or deformation is provided in the latching region 10. The base plate 24 extends in terms of surface area with the major part thereof over the travelling pad 23. An elastomer layer 26 is disposed between a wearable steel body 27 which engages into the guide grooves 1 in a tubular body 22, which is shown in dash-dotted line. Similarly to the abutments 5, 6 shown in FIGS. 1 and 2, the base plate 24 is also disposed between abutments 28 and 29. An opening for lifting the tongue 25 out of the tubular body 22 is identified by reference numeral 30.

Figure 5:
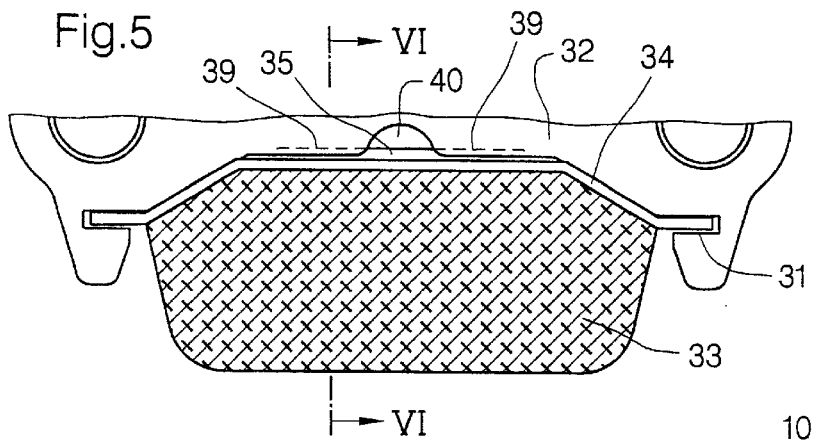
FIG. 5 is a view in cross-section of a further travelling pad in a crawler track link member.
Figure 6:
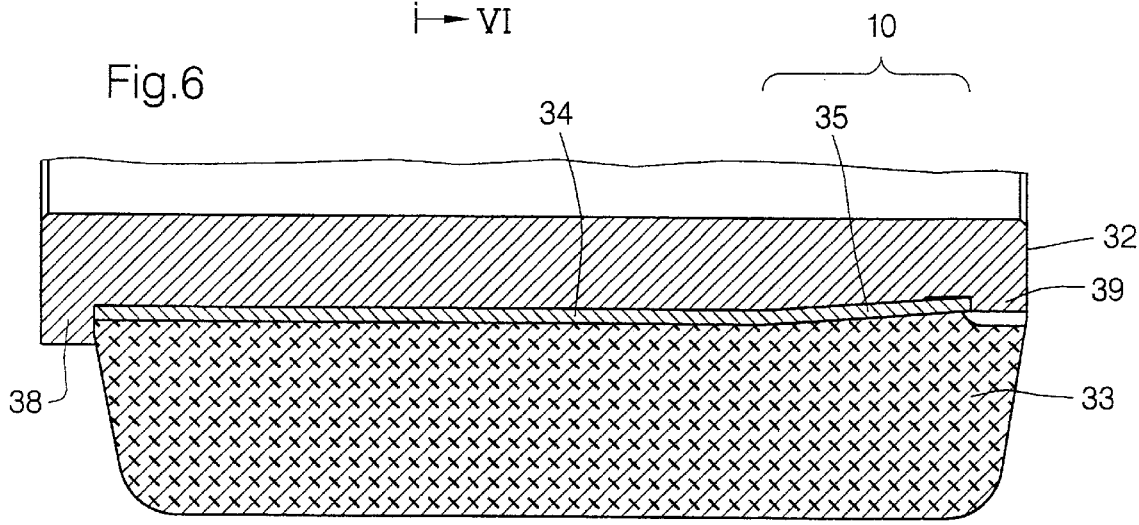
FIG. 6 is a view in section taken along line VI—VI in FIG. 5.

As shown in FIGS. 5 to 7, a travelling pad 33 which is fixed in a tubular body 32 has a base plate 34 corresponding to that of FIGS. 2 and 4. The base plate 34 has two shaped or deformation zones 36 in the retaining region 10. Those shaped zones 36 provide for the formation of a deformation 35 corresponding to the angle 17 with respect to the main plane 9, as shown in FIG. 2. The base plate 34, which extends between abutments 38 and 39, is the carrier of the travelling pad 33 and at the same time it serves to form a positively locking connection with the tubular body 32 by engagement into the guide grooves 31 of the tubular body 32. An opening 40 serves for disengagement of the deformation 35 at the abutment 39.

Figure 8:
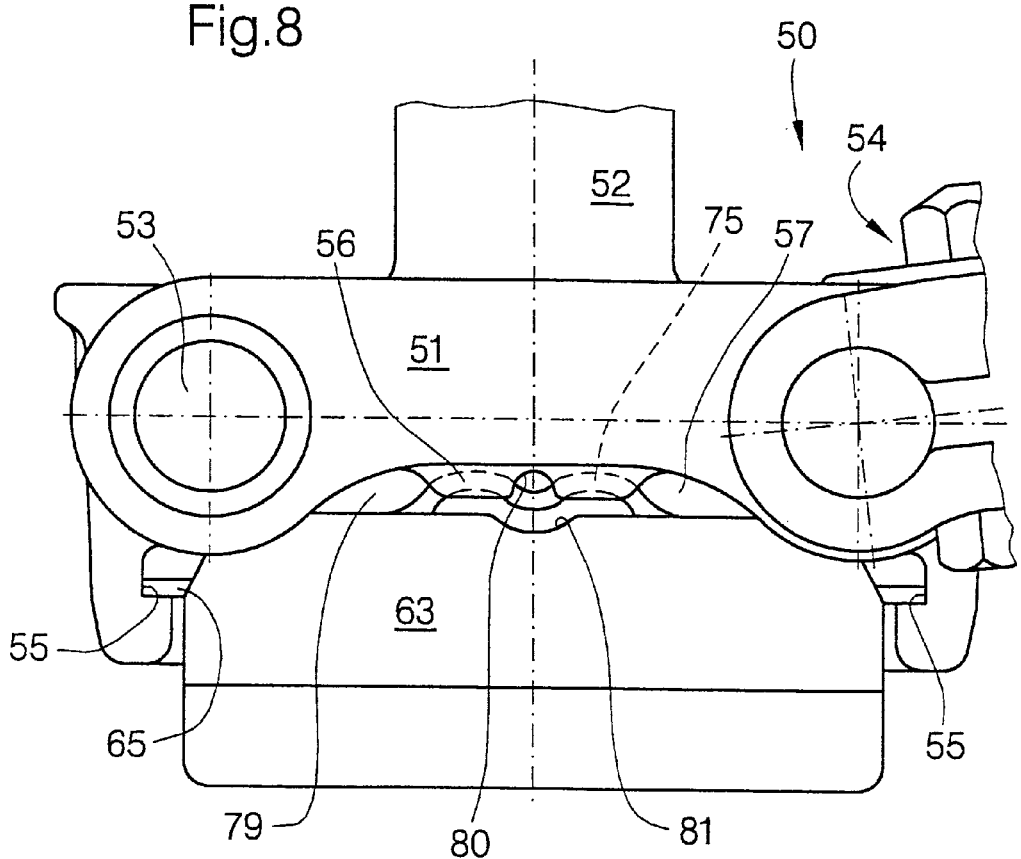
FIG. 8 shows a portion of a crawler track with a travelling pad.

In the case of a crawler track 50 as shown in FIG. 8, tubular bodies 51 with guide teeth 52 are hingedly connected together by means of rubber-mounted pins 53 which are arranged in the tubular bodies 51, and connectors 54 which are fixed on the pins 53.

Each tubular body 51 has guide grooves 55 and abutments 56, 57 for fixing a travelling pad 63. The abutment at the insertion side is denoted by reference numeral 56 and the abutment at the rear side is denoted by reference numeral 57.

Figure 9:
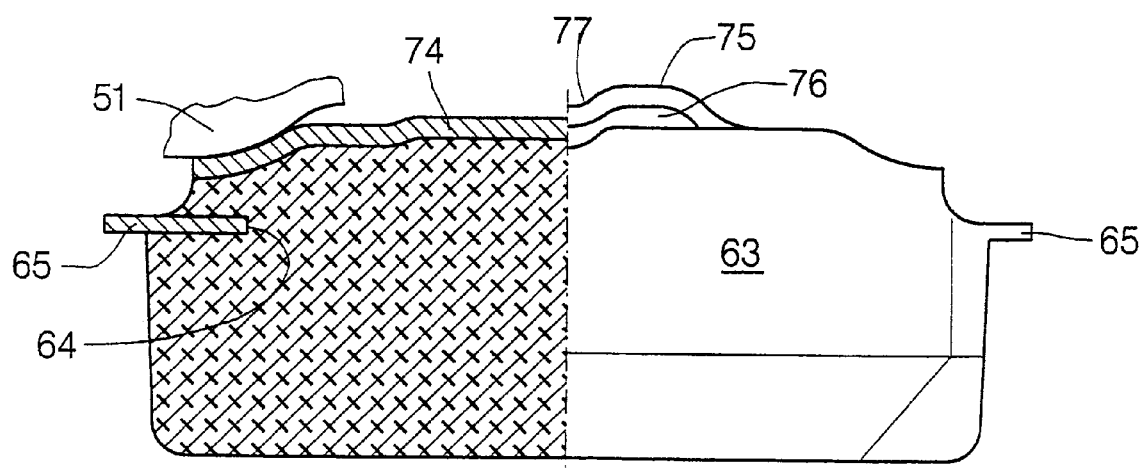
FIG. 9 shows a sectional view of part of a travelling pad as shown in FIG. 8.

As shown in FIG. 9, an intermediate plate 64 with guide bars 65 for the guide grooves 55 and a base plate 74 with a deformations or shaped portion 75 are joined to the travelling pad 63 through vulcanizing. The deformation or shaped portion 75 has rubber disposed therebeneath in the latching region 10.

As shown in FIG. 8, the tongue 75 of the base plate 74 has a double corrugated shape. That is afforded by the three shaped zones 76 and 77 as shown in FIG. 10.

In addition the base plate 74 has an end abutment 78 which corresponds with a rear wall 79 with the abutment 57 of the tubular body 51.

The abutment 56 of the tubular body 51 is provided with a central recess 80 which corresponds to an oppositely disposed recess 81 in of the travelling pad 63.

Finally, the base plate 74 has stiffening beads or corrugations 81 which are disposed in the direction of travel 80 of the crawler track 50, as shown in FIG. 10.

What is claimed is:

1. A crawler track link member (2) having a tubular body including abutments (5, 6) at opposite ends of said body, guide grooves (1) extending between said abutments, said abutments forming latching means (5, 6) for members (3) which are slidable into said grooves so as to be disposed therein, each said member (3) including a resilient base plate (4) which is engaged at one said abutment (6) having an opening (7) in said tubular body (2) associated therewith, said base plate (4) being slidable over the abutment (6) during respectively insertion and withdrawal from said guide grooves (1) by being accessed through said opening (7), characterized in that the base plate (4) is tongueless in a latching region (10) of said latching means (5, 6), and said base plate (4) includes deformation zones proximate said latching region (10).

2. A crawler track link member according to claim 1, wherein the base plate (4) is disposed in the latching region (10) within a main plane (9) of the base plate (4).

3. A crawler track link member according to claim 2, wherein the base plate (14) subtends an angle (17) with the main plane (9) in the latching region (10).

4. A crawler track link member according to claim 3, wherein in the latching region (10) the base plate (14) forms said angle (17) by a non-cutting shaping deformation.

5. A crawler track link member according to claim 1, wherein said base plate (74) is a tongueless member located in a traveling pad (63) in spaced relationship from an intermediate plate (64) located in said traveling pad, said intermediate plate (64) comprising guide bars (65) in engagement with the guide grooves (1) in said tubular body (51).

6. A crawler track link member according to claim 3, wherein a deformation (15) in said base plate has an angled run-on portion (17) in a sliding direction relative to the abutment (6) over which said base plate is slidable.

7. A crawler track link member according to claim 1, wherein said base plate (4) has a continuously extending uninterrupted end surface proximate said one abutment (6).

8. A crawler track link member according to claim 7, wherein said base plate (74) possesses a double curvature forming a contact stop through shaped deformation zones (76, 77).

* * * * *

UNITED STATES PATENT AND TRADEMARK OFFICE
CERTIFICATE OF CORRECTION

PATENT NO. : 6,217,135 B1
DATED : April 17, 2001
INVENTOR(S) : K. Spies et al.

It is certified that error appears in the above-identified patent and that said Letters Patent is hereby corrected as shown below:

Title page,
Item [30], Foreign Application Priority Data, "198 20 175" should read
-- 198 20 175.3 --

Column 2,
Line 1, "base plates," should read -- base plates --
Line 61, "23—similarly" should read -- 23-similarly --

Column 3,
Lines 10-11, "formation of a deformation 35 corresponding" should read -- formation of a deformation or shaped portion 35 corresponding --
Lines 17-18, "deformation 35 at the abutment 39" should read -- deformation or shaped portion 35 at the abutment --
Line 47, "crawler track 50, as shown in Fig. 10" should read -- crawler track 50, as shown in Figure 10. --.

Signed and Sealed this

Third Day of September, 2002

Attest:

JAMES E. ROGAN
*Attesting Officer*  *Director of the United States Patent and Trademark Office*